March 9, 1971  A. SCHMID  3,568,364
DEVICE FOR EMERGENCY CLOSING OF A POWER
OPERATED AUTOMOBILE SUNROOF
Filed Oct. 8, 1969
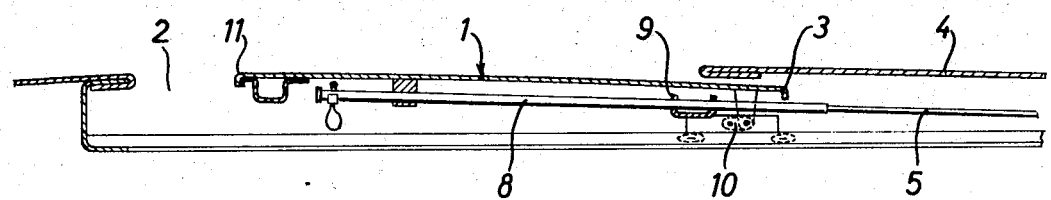
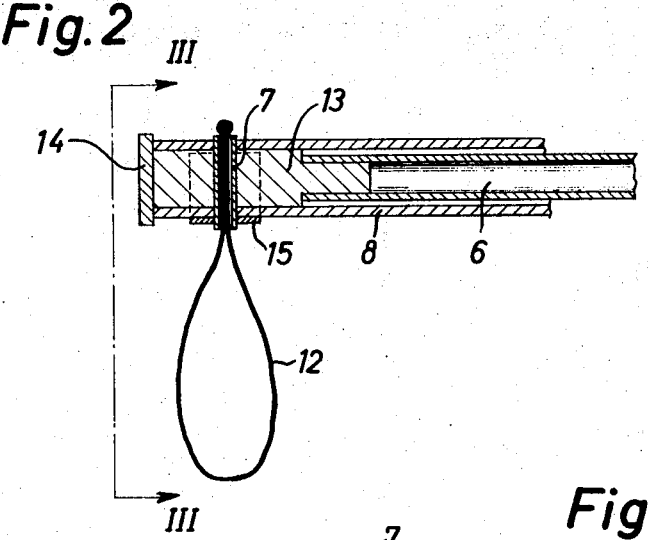
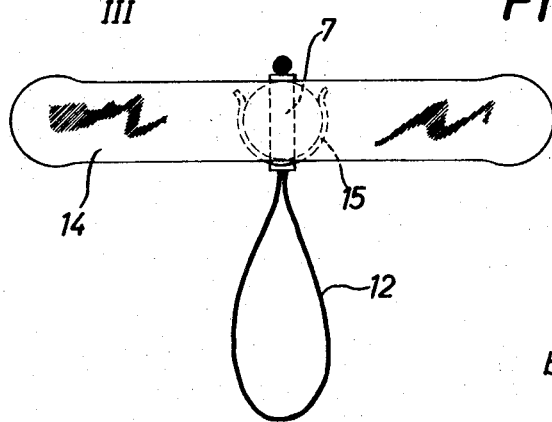
Inventor:
Alfred Schmid
Attorney

United States Patent Office 3,568,364
Patented Mar. 9, 1971

3,568,364
DEVICE FOR EMERGENCY CLOSING OF A POWER OPERATED AUTOMOBILE SUNROOF
Alfred Schmid, Munich-Furstenried, Germany, assignor to Webasto-Werk G.m.b.H., Stockdorf, Germany
Filed Oct. 8, 1969, Ser. No. 864,784
Claims priority, application Germany, Oct. 25, 1968, P 18 05 347.9
Int. Cl. E05f 15/00
U.S. Cl. 49—139     6 Claims

ABSTRACT OF THE DISCLOSURE

A device for the emergency manual closing of a power operated automobile sunroof which has a rear transverse carrying bridge and linkage to lower and raise the rear portion of the sunroof which is pulled open and pushed closed by an electric motor and a screw-threaded cable whose forward end is attached to the bridge. The closing device consists of a forward extension of the cable and a connecting tube extending forward from the bridge to a point where the two are connected in a quick-release coupling, and means for manually pulling the sunroof closed.

BACKGROUND OF THE INVENTION

Field of the invention

This invention relates to actuating means for sliding vehicle body panels, and more especailly to power operated sunroofs of automobiles. The invention is concerned with a device allowing emergency closing by hand of an open sunroof which is normally shifted by means of a motor and screw-threaded cable. To open, it is moved into position under a stationary part of the vehicle roof after it has been lowered from an opening in the roof, to close, these steps are reversed.

Description of the prior art

Emergency actuating devices are in general only known in vehicle sliding roofs of the above-indicated type which are driven by an electric motor, these emergency actuating devices including a crank handle by means of which the sunroof may be actuated when the electric motor ceases to function. In such known arrangements, the crank handle is frequently of the kind which is to be inserted into a mechanism which is only accessible from the luggage space or boot of a vehicle, and, for this purpose, it is usually also necessary to remove the spare wheel stored in the boot.

SUMMARY OF THE INVENTION

The primary object of the invention is to replace the above-described, complicated known form of an emergency actuating device—which has been necessary in all cases in which the motor drive could only be accommodated in the rear part of the roof—by a substantially simpler emergency actuating device.

According to the invention this object is realized by providing a device for interrupting the mechanical connection between the sunroof and the screw-threaded cable, by means of which the sunroof is normally mechanically pulled open and pushed closed, and by further providing an additional device which enables the closing of the open sliding sunroof to be effected manually in the case of a mechanical or electrical failure in the mechanical actuating device.

In sliding sunroof structures in which the sliding panel includes a carrying bridge which controls the panel lifting and lowering mechanism, and which is moved by a telescopic tube, one member thereof linking together the carrying bridge and one end of a screw-threaded cable which is pushed or pulled by the motor, there may be provided a releasable connection between said end of the cable, or of the extension thereof, and said telescopic tube, and at the same time an actuating member may be provided for manually moving the carrying bridge so as to close the sunroof.

In a preferred embodiment of the invention, both the releasable connection between the cable and the telescopic tube, and the actuating member, are arranged under the slidable sunroof panel and the interior lining or canopy of the slidable sunroof is detachably mounted to the lower side of the sliding cover so as to enclose the device. Conveniently, both the releasable connection and the actuating member are arranged under the front end of the slidable sunroof panel. In this way, the apparatus remains accessible even when the roof is all the way open.

It may be found expedient to provide, as an actuating member for manually moving the carrying bridge, a traction member connected to this carrying bridge, for example a rod, or a strip or band of metal or synthetic plastics material. However, it is suggested to preferably use for this purpose the outer member of the telescopic tube itself which is attached to the carrying bridge and which may be equipped with a handle at its front end.

The releasable connection between the cable and the telescopic tube member is, for simplicity, effected by a pin which traverses both the telescopic tube member and an extension of the screw-threaded cable which is guided within the telescopic tube member. This pin may be provided with a retainer spring for securing it in position and, in one convenient form of constructon, is equipped wth a nylon cord or the like by which the pin can be withdrawn when emergency closing of the slidable sunroof becomes necessary.

The following description, read in conjunction with the accompanying drawings, discloses a preferred embodiment of the emergency-closing device according to the invention, given by way of example only.

BRIEF DESCRIPTION OF THE DRAWING

FIG. 1 is a longitudinal center cross-section taken through the sunroof portion of a vehicle roof, which includes an emergency actuating device according to the invention;

FIG. 2 illustrates, in cross-section and on an enlarged scale, the parts of the emergency actuating device located under the front end of the sunroof panel; and FIG. 3 represents a front view of the outer telescopic tube member and of the handle for emergency manual closing, as viewed in the direction of line III—III in FIG. 2.

DESCRIPTION OF THE PREFERRED EMBODIMENT

As can be seen from FIG. 1, a sliding sunroof panel 1 of the vehicle roof structure is adapted to fit into a closable roof opening 2, from which it can be caused to slide toward the rear, after the rear end 3 of the panel has been lowered to a position beneath a stationary roof part 4. The sliding panel 1 is moved by a conventional screw-threaded cable which is moved back and forth by an electric motor and drive collet (not illustrated), the cable being guided inside a guide tube 5. On its forward end the cable has an extension 6 which, as can be seen in FIG. 2, is inserted into, and connected by a pin 7, to a tube member 8, which is in turn connected to a carrying bridge 9. The guide tube 5 and the tube member 8 form a telescopic guide tube and a protective enclosure for the screw-threaded cable and its extension 6. The carrying bridge 9 has, at its lateral ends, pivot levers 10, of which one is visible in FIG. 1, connecting the sliding panel 1 to the carrying bridge 9. When the bridge 9 is moved toward the rear under the stationary roof part 4, the rear end of the sliding cover is lowered, following which the sliding panel 1 is moved together with the bridge 9, toward the rear and under the stationary roof part 4.

If, when the slidable sunroof is open, a mechanical or electrical defect occurs in the actuating mechanism so that the latter fails to close the sunroof as desired, then the sunroof panel can be closed quickly by hand in the following manner:

First, the interior lining on the slidable panel 2 (the lining of the conventional kind, is not shown in the drawing) is detached from the front end 11 of the panel to expose the parts shown in FIG. 2. Then the pin 7 is withdrawn by pulling on the nylon cord 12, so that the connection between the tube member 8 and a head 13 which is fastened to the cable extension 6 is broken. It is then possible, by means of a handle 14, shown in FIG. 3, which is fixed to the forward end of the telescopic tube member 8, to move the carrying bridge 9 to which the rear end of the telescopic tube member 8 is attached. Thus, the sliding cover 1 is pulled forward, so that eventually the lifting device constituted by the pivot levers is actuated to close the sunroof. When the pin 7 is in its engaged position, it may be held in place in the telescopic tube member 8 and the coupling head 13, by a spring clip 15.

The invention is not limited to the details of the embodiment thereof illustrated, but may be modified in various ways, and applied to other types of sliding sunroofs, without departing from the scope of the invention as defined in the appended claims.

I claim:

1. A device for the emergency manual actuation of power operated vehicle body panels such as for the manual closing of sunroofs of automobiles and the like, where the movable body panel is equipped with a rear transverse carrying bridge and connecting levers to lower the rear portion of the body panel out of the body opening before sliding the panel back to an open position and to raise the same after forward motion to close the opening, and where the drive means include an electric motor and a screw-threaded cable by means of which the sliding bridge is pulled open and pushed closed from behind the movable body panel; the device comprising in combination with the above
    a cable extension affixed to the screw-threaded cable and extending forward so that its forward end is located in the vicinity of the forward edge of the body panel;
    a telescopic tube surrounding and guiding the screw-threaded cable and its extension to prevent their flexing over the stressed portion of their length;
    a rigid connecting member affixed to the carrying bridge and extending from it to the forward end of said cable extension; and
    means to releasably couple the forward ends of said cable extension and connecting member, so that the opened body panel can be quickly reclosed in an emergency by releasing said coupling means and by manually pulling said connecting member and carrying bridge forward to effect closing.

2. A device as claimed in claim 1, wherein
    said connecting member is in the form of a tube which also serves as the outermost member of said telescoping tube.

3. A device as claimed in claim 2, wherein
    said coupling means include a coupling head attached to the forward end of said cable extension and slidably fitted into said telescoping tube member, and a coupling pin insertable across said coupling head and said telescoping tube member, whereby, when said coupling pin is released to manually close the body panel, said coupling head slides inside said telescoping tube member, thus affording a re-coupling possibility when the panel is manually reopened to the position it held before manual closing.

4. A device as claimed in claim 3, wherein
    said coupling means further include a spring clip retaining said coupling pin in the inserted position and a pull cord attached to one end of said pin for quick release of said coupling means in case of an emergency.

5. A device as claimed in claim 1, wherein
    said connecting member includes a handle at the forward end thereof to facilitate manual moving of the body panel.

6. A device as claimed in claim 1, further including
    a pulling member attached by its rear end to the carrying bridge, said member being of flexible material.

References Cited

UNITED STATES PATENTS

| | | | |
|---|---|---|---|
| 1,778,360 | 10/1930 | Gorman | 49—139X |
| 3,002,785 | 10/1961 | Larche | 160—201X |
| 3,031,226 | 4/1962 | Larche | 296—137F |
| 3,050,336 | 8/1962 | Werner | 296—137E |

FOREIGN PATENTS

| | | | |
|---|---|---|---|
| 824,522 | 12/1959 | Great Britain | 296—137F |
| 733,448 | 3/1943 | Germany | 296—137F |

DENNIS L. TAYLOR, Primary Examiner

U.S. Cl. X.R.

296—137